United States Patent
Bayer et al.

(10) Patent No.: US 8,220,363 B2
(45) Date of Patent: Jul. 17, 2012

(54) BEVEL GEAR TRANSMISSION

(75) Inventors: Thomas Bayer, Igersheim (DE); Karl-Georg Melber, Weikersheim-Elpersheim (DE); Michael Engelbreit, Riedenheim (DE); Thomas Wilhelm, Creglingen (DE)

(73) Assignee: Wittenstein AG, Ingersheim (DE)

( * ) Notice: Subject to any disclaimer, the term of this patent is extended or adjusted under 35 U.S.C. 154(b) by 0 days.

(21) Appl. No.: 12/950,675

(22) Filed: Nov. 19, 2010

(65) Prior Publication Data

US 2011/0065545 A1 Mar. 17, 2011

Related U.S. Application Data

(62) Division of application No. 11/658,726, filed as application No. PCT/EP2005/007095 on Jul. 1, 2005, now abandoned.

(30) Foreign Application Priority Data

Aug. 6, 2004 (DE) ............... 10 2004 038 581

(51) Int. Cl.
*F16H 57/02* (2006.01)
(52) U.S. Cl. .................................. 74/606 R
(58) Field of Classification Search .......... 704/606 R, 704/416, 417; 475/198, 200, 201, 202, 162, 475/163, 178
See application file for complete search history.

(56) References Cited

U.S. PATENT DOCUMENTS

| | | | | |
|---|---|---|---|---|
| 3,774,477 A | * | 11/1973 | Murphy | 475/337 |
| 3,916,629 A | | 11/1975 | Thompson | |
| 4,811,616 A | * | 3/1989 | Henderson | 74/421 A |
| 5,220,852 A | | 6/1993 | Shinoda et al. | |
| 5,281,061 A | | 1/1994 | Ueda et al. | |
| 5,651,747 A | | 7/1997 | Minegishi et al. | |
| 6,234,037 B1 | * | 5/2001 | Zimmer | 74/421 A |
| 6,255,751 B1 | * | 7/2001 | Hoffmann | 310/83 |
| 6,485,394 B1 | * | 11/2002 | Minegishi et al. | 477/183 |
| 6,869,378 B2 | | 3/2005 | Yamasaki et al. | |
| 2002/0155915 A1 | | 10/2002 | Tanaka | |
| 2005/0081662 A1 | * | 4/2005 | Bouche | 74/333 |
| 2006/0156842 A1 | | 7/2006 | Melber et al. | |

FOREIGN PATENT DOCUMENTS

| | | |
|---|---|---|
| DE | 10234749 | 2/2004 |
| EP | 0517387 | 12/1992 |
| EP | 1326032 | 7/2003 |
| FR | 2547007 | 12/1984 |
| JP | 4-109835 | 9/1992 |
| WO | WO 2004015310 A1 * | 2/2004 |

OTHER PUBLICATIONS

Official Action dated Sep. 7, 2010 for JP 2007-524201.
Official Action dated Jul. 12, 2011 for JP 2007-524201.

* cited by examiner

*Primary Examiner* — Justin Holmes
(74) *Attorney, Agent, or Firm* — Backman & LaPointe, P.C.

(57) ABSTRACT

A conical gear drive comprising an input element that interacts with a truncated conical gear via which an output element can be driven. A number of different output elements or variably selectable output elements should be able to be connected to the truncated conical gear drive.

11 Claims, 4 Drawing Sheets

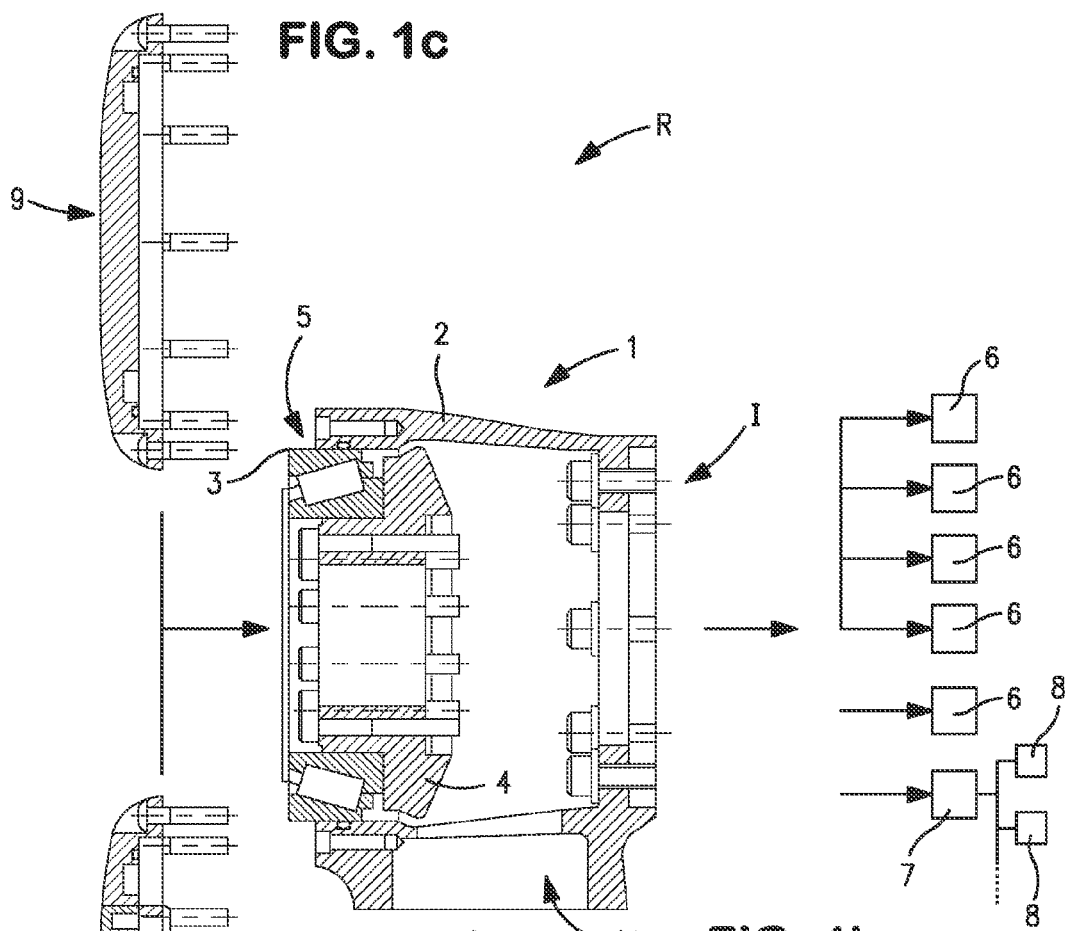
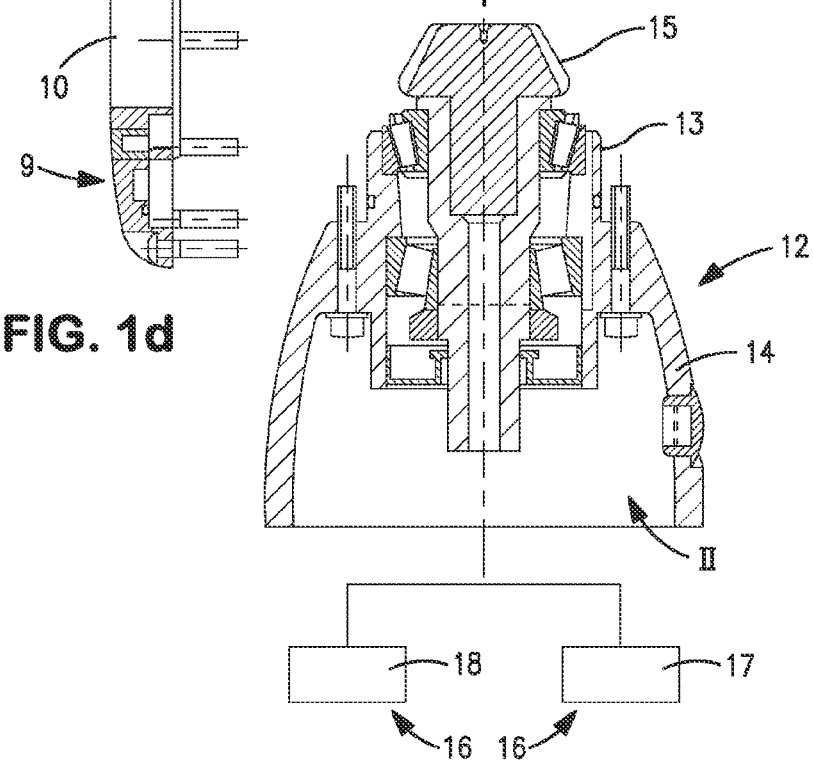
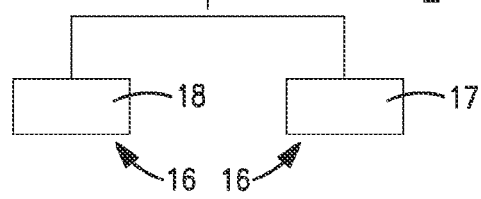

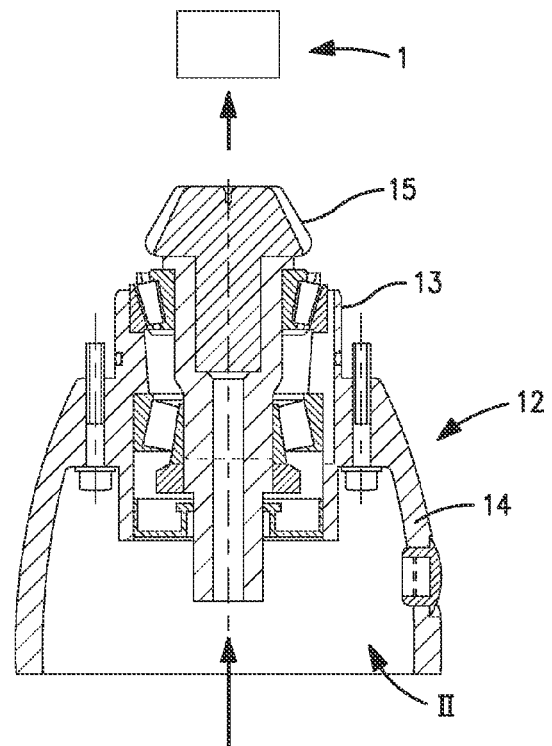
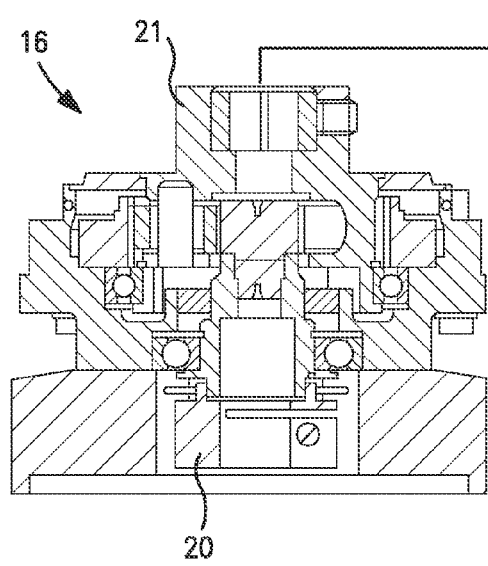
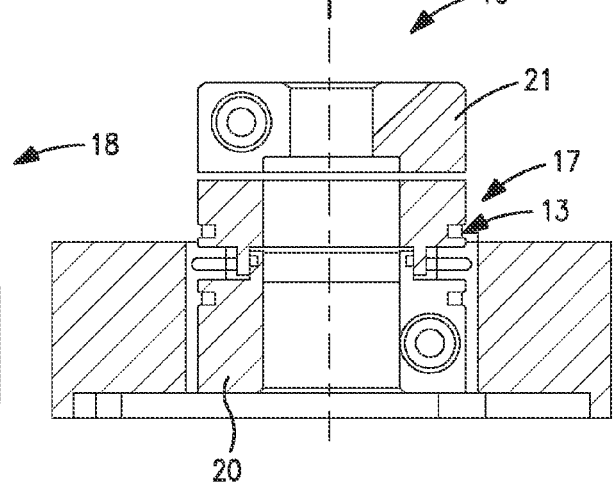
FIG. 2a
FIG. 2b
FIG. 2c

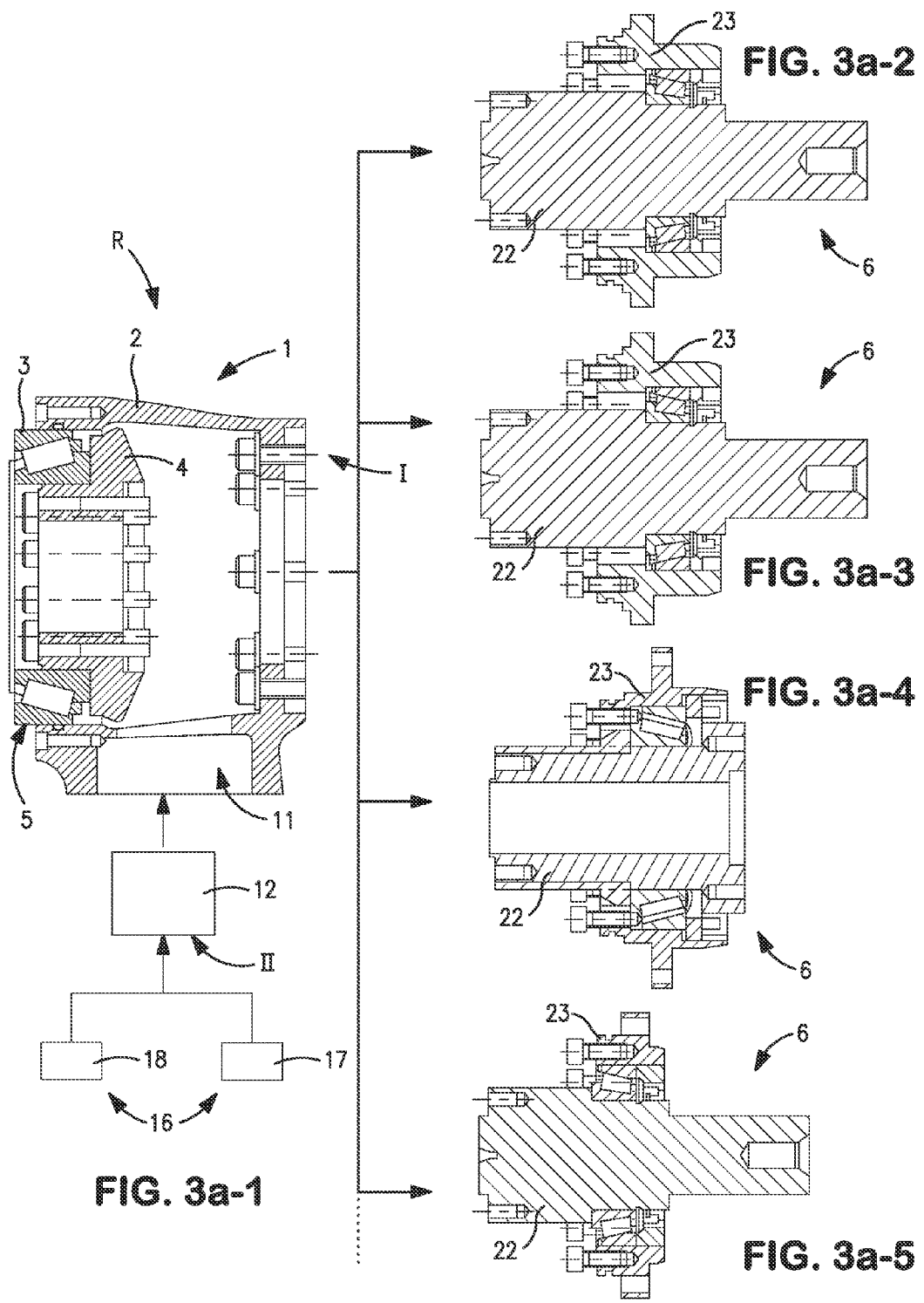

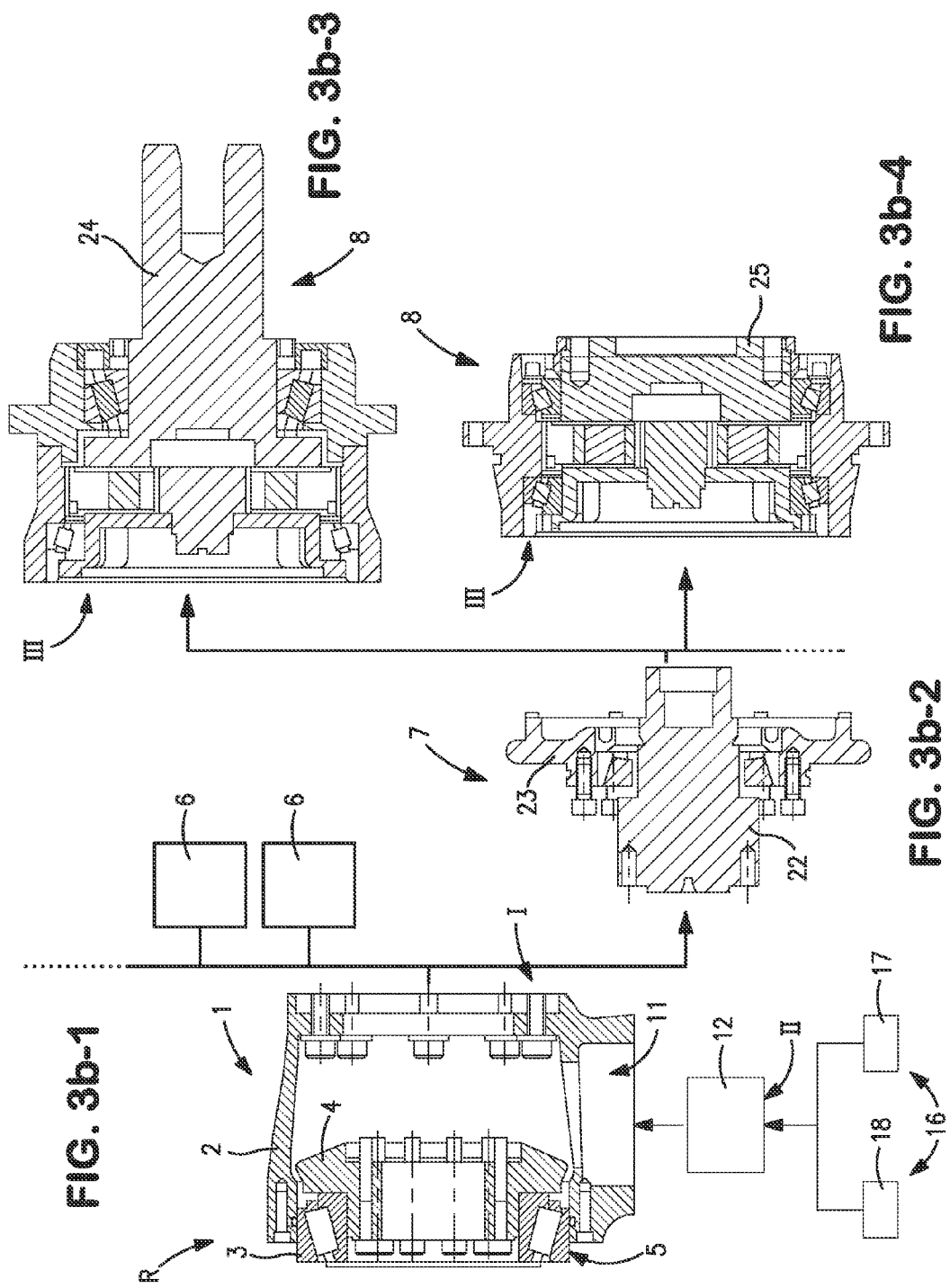

BEVEL GEAR TRANSMISSION

BACKGROUND OF THE INVENTION

The present invention relates to a bevel gear transmission having an input drive element which interacts with a core bevel gear transmission by means of which an output drive element can be driven.

Bevel gear transmissions, also referred to as angular gearings, are known and available on the market in a wide variety of forms and designs. They serve essentially to redirect torque. There are therefore different basic types of bevel gear transmissions, designed for example with (hypoid transmission) or without (bevel gear transmissions) an axial offset. Said transmissions differ substantially in terms of their input drive subassemblies and are therefore designed differently.

Conventional bevel gear transmissions are also known which can be produced in different sizes and can be produced in an expensive and complex fashion with different subassemblies as separate series in each case.

A disadvantage of the previous bevel gear transmissions is that separate housings, separate units and separate production lines are generally necessary to produce a bevel gear transmission with different input drives.

EP 0 517 387 A2 discloses a tool adapter which redirects an input drive torque through an angle to provide an output drive torque. A conventional angular gearing is used here.

EP 1 326 032 A1 discloses a type series of differently-dimensioned electric motors, each of which has a transmission flange-mounted onto the output drive side. The transmission is embodied as a separate component.

U.S. Pat. No. 6,234,037 B1 describes a modular transmission system in which different electric motors can be connected to or flange-mounted onto the transmission.

DE 102 34 749 A1 discloses a bevel gear transmission in which an input drive bevel gear 8 engages in and interacts with an input drive shaft mounted on a housing.

FR-2 547 007 A presents a conventional common differential transmission as is also used in the field of vehicle technology.

The present invention is therefore based on the object of producing a universal bevel gear transmission which can be easily produced in a modular manner for different output drive variants and input drive variants. This is intended in particular to make it possible for customer-specific requests to be realized and implemented very quickly, so that a customer-specific transmission can be delivered very quickly. It is also intended to provide a bevel gear transmission which is cost-effective to produce. It is also intended to make it possible to produce a plurality of different angular gearings with one and the same core bevel gear transmission, with regard to input drive variants, with regard to output drive variants and different installation sizes, with substantially the same components.

SUMMARY OF THE INVENTION

The foregoing object is achieved by the present invention by providing a bevel gear transmission having an input drive element which interacts with a core bevel gear transmission by means of which an output drive element can be driven, characterized in that a plurality of different output drive elements or variably selectable output drive variants can be connected to the core bevel gear transmission.

In the case of the present invention, it has proven to be particularly advantageous for the bevel gear transmission to be formed substantially from one common, universal core bevel gear transmission in which one bevel gear is inserted and which, opposite the bevel gear, forms a universal interface I.

An input drive element can be plugged in perpendicularly with respect to the bevel gear or the universal interface I, which input drive element likewise forms a universal interface II for flange-mounting different selectable input drives.

This means that, by using two universal interfaces, any desired different bevel gear transmissions with different input drive and output drive variants can be produced for all bevel gear transmissions with variably selectable input drive elements and variably selectable output drive elements. Here, different output drive variants can be used for different kinematic properties, different output drives, for example with regard to an output drive shaft or output drive flanges. If appropriate, further output drive stages designed as single-stage or multi-stage drive output stages with different kinematic properties can be attached by means of corresponding universal interfaces and suitable interfaces. Said drive output stages can be embodied as step-down or step-up transmissions with different output drives, formed by output drive shafts or output drive flanges.

The same is true in the input drive region, with it being possible for different input drives, formed as planetary pre-stages or motor add-on subassemblies, to be attached at the input drive side to the common input drive element by means of the universal interface II. This makes it possible for a bevel gear transmission with the desired kinematic properties to be produced cost-effectively in a customer-specific fashion with a reduced number of components, which can also include other modules of conventional transmissions.

BRIEF DESCRIPTION OF THE DRAWINGS

Further advantages, features and details of the invention can be gathered from the following description of preferred exemplary embodiments and on the basis of the drawing, in which:

FIGS. 1a through 1d are schematically illustrated partially cross-sectional illustration of a bevel gear transmission, in particular angular gearing, according to the invention in modular form;

FIGS. 2a through 2c are longitudinal cross-sectional illustration through a region of the input drive element with two different attachable input drives;

FIGS. 3a-1 through 3a-5 are schematically illustrated longitudinal cross-sectional illustration through the bevel gear transmission, in particular in the region of a universal interface I with different output drive elements which can be attached thereto;

FIGS. 3b-1 through 3b-4 are schematically illustrated partially longitudinally cross-sectional illustration with further output drive variants, with it being possible for different output drive stages to be selectively connected by means of an interface.

DETAILED DESCRIPTION

In FIGS. 1a through 1d, a bevel gear transmission, embodied as an angular gearing, has a core bevel gear transmission 1 which has a housing 2. In the housing 2, a bevel gear 4, if appropriate embodied as an internal bevel gear, is inserted in an opening 5 by means of a bearing 3.

A universal interface I is formed in the housing 2 opposite the opening 5, which universal interface I serves to hold and center arbitrarily selectable output drive elements 6, as indicated merely schematically in FIGS. 1a through 1d. It is also possible if appropriate for an interface 7 to be connected instead of an output drive element 6 to the universal interface I of the core bevel gear transmission 1, to which interface 7 any desired number of different output drive stages 8 can be attached.

The output drive stages 8 can be embodied as step-down transmissions or step-up transmissions. It is also possible within the scope of the present invention for the different output drive stages to be connected to an output drive shaft by means of an output drive flange 25 (see FIGS. 3b-1 through 3b-4). Here, it is possible by forming a universal interface III, see FIGS. 3b-1 through 3b-4, for different drive output stages to be connected to the interface 7 and therefore to the core bevel gear transmission 1.

Different covering elements 9 can be universally connected to the housing 2 in the region of the opening 5, in particular in the region of the bevel gear 4, so that the opening is completely closed off if the closed embodiment of the covering element 9 is used, or if appropriate, a plug-in opening is formed in the region of the bevel gear 4 if a covering element provided with an opening 10 is used.

It is also important in the case of the present invention that a receiving opening 11 is provided approximately perpendicular to the opening 5 or to the universal interface I, into which receiving opening 11 an input drive element 12 can be plugged. For this purpose, the input drive element 12 has a housing 14 which forms a flange 13 which can be connected to the housing 2 of the core bevel gear transmission 1, in particular to the receiving opening 11. Here, the input drive element 12 is then precisely centered with the receiving opening 11 by means of the flange 13. If appropriate, the core bevel gear transmission 1 and the input drive element 12 are fixedly welded to one another.

A bevel gear shaft 15 of at least partially hollow design is mounted in bearings (not illustrated in any more detail or numbered here) within the housing 14 of the input drive element 12. Here, the bevel gear shaft 15 is formed by a bevel pinion and a bevel pinion shaft.

A universal interface II is formed opposite the bevel gear 4. It is possible, as merely indicated in FIGS. 1a through 1d, for different input drives 16 to be selectively plugged into the universal interface II as desired. Here, the input drives 16, as illustrated in the exemplary embodiment in FIGS. 2a through 2c, can be embodied as a motor add-on subassembly 17 or a planetary pre-stage 18. The motor add-on subassembly 17 as an input drive 16 has a preferably rigid shaft coupling 19 which has attached to it a shaft flange 20 for holding any desired motor, electric motor or the like.

The planetary pre-stage 18 can be embodied as a single-stage or multi-stage planetary pre-stage 18, with the latter likewise having a shaft flange 20 for holding an electric motor or the like.

This makes it possible to produce different bevel gear transmissions R when different input drives, embodied as single-stage or multi-stage planetary pre-stages 18 or motor add-on subassemblies 17 are integrated and plugged in by means of a common input drive element 12. The bevel gear shaft 15 or its bevel pinion shaft then engage, so as to be driven, into corresponding output drive shafts 21 of the motor add-on subassembly 17 or of the planetary pre-stage 18 when the latter are connected to the input drive element 12. Here, the motor add-on subassembly 17 can be embodied as a pure shaft coupling or a shaft with an axial coupling.

In the exemplary embodiment of the present invention as per FIGS. 3a-1 through 3a-5, the bevel gear transmission R is shown in modular form, with it being possible for any desired different output drive elements 6 to be connected to the universal interface II.

Here, the first two output drive elements 6 are if appropriate also dimensioned differently with different flanges or shafts for different output drive variants. Corresponding hollow shafts can also form the output drive element 6.

In the present invention, it is significant that customer-specific desired output drive variants can be connected as output drive elements 6 by means of the universal interface II to the core bevel gear transmission 1, with it being possible for the shafts 22, if appropriate also embodied as hollow shafts, of said output drive elements 6 to be connected to the bevel gear 4 of the core bevel gear transmission 1 and for corresponding flanges 23 to be connected to the housing 2 of the bevel gear transmission 1, in particular in the region of the universal interface I.

In the exemplary embodiment as per FIGS. 3b-1 through 3b-4, it is also possible in the above described manner for the interface 7 to be universally and selectively attached to the universal interface I instead of an output drive element 6, which interface 7 likewise has, in the above described manner, a shaft 22 and a flange 23.

It is possible for output drive stages as step-up or step-down output drive stages 8 to be flange-mounted onto the interface 7 by means of a universal interface III, with the respective output drive stages 8 being of different design with regard to their kinematic properties, output drive shafts or output drive flanges. Said output drive stages 8 are also designed so as to be selectable in a customer-specific manner and can be connected to the core bevel gear transmission 1 by means of a common interface 7 of universal design. The output drive stage 8 is provided with an output drive shaft 24 or an output drive flange 25, with it being possible for corresponding step-up or step-down stages to be integrated therein.

The invention claimed is:

1. A bevel gear transmission comprising:
    an input drive member having an input side and an output side;
    a core bevel gear transmission comprising a housing, exactly one bearing inserted in an opening of the housing, a hollow internal bevel gear inserted in the opening and held by the exactly one bearing, an input connected to the output side of a housing of the input drive member, and an output with a first universal interface (I) arranged opposite to the internal bevel gear;
    a second universal interface (II) output connected to the input side of the input drive member, wherein the input drive member is used for bearing a bevel gear shaft, and wherein the bevel gear shaft engages into a corresponding output drive shaft;
    a plurality of different output drive elements selectively connected to the output of the core bevel gear transmission, wherein the first universal interface (I) arranged inside the housing of the core bevel gear serves to hold and center the output drive elements;
    wherein the output drive element comprises a separate flange being selectively connected to the housing and being used for bearing an output drive shaft reaching into the housing and into the hollow internal bevel gear; and
    a plurality of variably selectable input drives selected from a motor add-on subassembly and/or planetary pre-stage connected to an input of the universal interface (II).

2. The bevel gear transmission as claimed in claim 1, wherein the output drive stages are embodied as step-down stages for different output drives.

3. The bevel gear transmission as claimed in claim 1, wherein the output drive elements are connected to the first universal interface (I) of the core bevel gear transmission wherein a shaft is connected fixedly or in a detachable fashion to the bevel gear of the core bevel gear transmission.

4. The bevel gear transmission as claimed in claim 1, wherein the different output drive elements are of different sizes and are connected in a user-specific manner to one and the same first universal interface (I) of the universal core bevel gear transmission.

5. The bevel gear transmission as claimed in claim 1, wherein the input drive element can be plugged with a bevel gear shaft into the core bevel gear transmission, with the bevel gear shaft interacting with the bevel gear of the core bevel gear transmission, and with a universal interface (II) for attaching any desired input drives, embodied as motor add-on subassemblies or planetary pre-stages, being provided at the other end of the bevel gear shaft, with the input drive or the motor add-on subassembly or the planetary pre-stage being centered by means of the housing of the input drive element in the region of the universal interface (II), and with the bevel gear shaft of the input drive element engaging in or interacting with a corresponding output drive shaft of the input drive.

6. The bevel gear transmission as claimed in claim 1, wherein a motor add-on subassembly which is embodied as an input drive is provided with a shaft, a shaft coupling and a shaft flange (20).

7. The bevel gear transmission as claimed in claim 1, wherein the planetary pre-stage which is embodied as an input drive has a housing which can be connected to, in particular centered with, the housing of the input drive, in particular of the universal interface (II) of the input drive, with the bevel gear shaft of the input drive engaging into an output drive shaft of the planetary pre-stage.

8. The bevel gear transmission as claimed claim 1, wherein single-stage or multi-stage planetary pre-stages can be attached to the input drive element as input drives.

9. The bevel gear transmission as claimed claim 1, wherein different cover elements can be connected to the core bevel gear transmission in the region of the bevel gear opposite the universal interface (I) of the output drive element.

10. The bevel gear transmission as claimed in claim 9, wherein the covering element is of closed design or is provided with at least one opening.

11. The bevel gear transmission as claimed in claim 1, wherein different output drive elements with individual kinematic properties can be universally connected to the universal interface (I) of the core bevel gear transmission.

\* \* \* \* \*

UNITED STATES PATENT AND TRADEMARK OFFICE
CERTIFICATE OF CORRECTION

PATENT NO. : 8,220,363 B2
APPLICATION NO. : 12/950675
DATED : July 17, 2012
INVENTOR(S) : Thomas Bayer et al.

It is certified that error appears in the above-identified patent and that said Letters Patent is hereby corrected as shown below:

On the Patent Title Page, item (73); Assignee Section, the address for the assignee should be "Igersheim (DE)" not --Ingersheim (DE)--

Signed and Sealed this
Thirtieth Day of October, 2012

David J. Kappos
*Director of the United States Patent and Trademark Office*